| United States Patent [19] | [11] Patent Number: 4,717,455 |
| --- | --- |
| Textor et al. | [45] Date of Patent: Jan. 5, 1988 |

[54] PROCESS FOR MANUFACTURING A MICROFILTER

[75] Inventors: Marcus Textor, Schaffhausen; Martin Werner, Singen; Wilhelm Franschitz, Neuhausen, Switzerland

[73] Assignee: Swiss Aluminium Ltd., Chippis, Switzerland

[21] Appl. No.: 932,447

[22] Filed: Nov. 18, 1986

[30] Foreign Application Priority Data

Nov. 25, 1985 [CH] Switzerland .......................... 5008/85

[51] Int. Cl.$^4$ .................. C25D 5/44; C25D 11/06; C25D 11/36; C25D 11/38
[52] U.S. Cl. .................................... 204/33; 204/38.3; 204/42; 204/129.3; 204/129.75; 204/295
[58] Field of Search ............ 204/129.1, 129.3, 129.75, 204/295, 33, 38.3, 129.35, 42, 37.2

[56] References Cited

U.S. PATENT DOCUMENTS

| 2,859,148 | 11/1958 | Altenpohl et al. | 204/33 X |
| 3,351,442 | 11/1967 | Hooper | 204/129.75 X |
| 3,578,570 | 5/1971 | Kissen | 204/33 |
| 3,864,219 | 2/1975 | Dosch et al. | 204/33 |
| 4,213,835 | 7/1980 | Fickelscher | 204/129.75 X |
| 4,225,398 | 9/1980 | Hasegawa et al. | 204/33 |
| 4,584,067 | 4/1986 | Hutchins et al. | 204/129.75 X |
| 4,606,975 | 8/1986 | Mohr | 204/33 X |

*Primary Examiner*—Donald R. Valentine
*Attorney, Agent, or Firm*—Bachman & LaPointe

[57] ABSTRACT

A process for manufacturing a microfilter is such that a foil having an aluminum content of at least 99.95% and thickness 20–250 μm is given a recrystallizing anneal, is etched in an electrolyte in stages at constant current density in the range 0.01 to 2 kA/m$^2$, and the surface given a stabilizing after treatment to prevent hydration reactions.

13 Claims, No Drawings

PROCESS FOR MANUFACTURING A MICROFILTER

BACKGROUND OF THE INVENTION

The invention relates to a process for manufacturing a microfilter from a recrystallized aluminum foil using electrolyte etching.

Microfilters are employed as partially permeable membranes in a series of separation processes in which particles having a minimum size of 0.02 to 10 μm in diameter suspended in a gaseous or liquid medium have to be separated out. Using such microfilters for example bacteria in water are held back by the membrane as the water flows through it under a pressure of about 0.1 MPa. The membranes employed up to now are mostly based on polymer foils and hollow polymer foils. These, however, give rise to some difficulties which have serious consequences in certain applications: limited thermal stability (to some extent prohibits sterilization); limited stability in organic solvents, swelling in water, usually no electrical conductivity.

Some help here is a process for manufacturing membranes having a pore diameter 0.2 to 10 μm out of aluminum in which a recrystallized aluminum foil is electrolytically etched. In that case a first etching is employed with a constant anode potential, throughout the duration of the stage and above the pitting potential of the aluminum, and a second etching is employed with a constant anode potential below the pitting potential.

A proposal for narrowing the pores further is made in which an aluminum oxide layer is anodically formed on the etched foils, or a hydrated aluminum oxide layer is formed by treatment in boiling water, as a result of which pore diameters down to 0.002 μm can be achieved.

Aluminum membranes manufactured that way, however, suffer decisive disadvantages:

Potentiostatic etching is, in practice, very difficult to control. There is in particular the danger that the smallest deviation in the effective potential from the optimal value leads to an undesired micro-pitting which excludes the product from use as a membrane foil. Even more decisive is the fact that the membranes manufactured by the above mentioned process are unstable as soon as they are employed for the filtration of aqueous media or non-aqueous media containing the smallest amount of water. This instability is expressed in a rapid drop in trans-membrane flow, which after a few hours is typically only 5 to 10% of the initial value and thus insufficient and uninteresting for microfiltration membranes compared to conventional polymer membrane foils. This drop is observed both with foils etched on one side and foils etched on both sides, with blank foils and with foils having an anodic aluminum oxide barrier layer.

SUMMARY OF THE INVENTION

The object of the invention is therefore to develop a process for manufacturing a microfilter which starts from recrystallized aluminum foils, employs electrolytic etching and eliminates the above mentioned difficulties viz., micro-pitting and instability.

The object is achieved by way of the invention in which a 20 to 250 μm thick aluminum foil of at least 99.95% purity is, after a recrystallizing anneal, etched in an electrolyte in steps of constant current density in the range 0.1 to 2 kA/m$^2$ and, in order to stabilize the surface, is subsequently treated to prevent a hydration reaction.

DETAILED DESCRIPTION

The etching can take place in one or more steps. Within each step, however, the current density must be kept constant; in practice deviations of less than 5% in the current density still allow the expression "constant" to be used. This galvanostatic method makes it possible to avoid micro-pitting. It turns out that if foils with an aluminum content of at least 99.95%, preferably at least 99.98% are employed, then the uniformity and reproducibility in the desired pore size and shape are particularly high. In order to reach the through-flow rate required in the filtration process and in order to facilitate uniform etching, the aluminum foil may be at most 250 μm thick. This ensures that the, possibly necessary, pressure difference in the separation process is not too high. Foils thinner than 20 μm do not exhibit sufficient mechanical stability, and exhibit a greater risk of uncontrolled through-thickness etching.

Stabilizing after-treatments that prevent hydration reactions have been found to be necessary and effective as a means of preventing the instability that results in a gradual drop in trans-membrane flow.

The etching can take place in a plurality of baths arranged in series or in one bath possibly with a plurality of zones in series through which the foil has to pass. According to the invention, however, care must be taken that galvanostatic etching takes place at each step. The total transformed charge should amount to 0.15 to 0.5 MC/m$^2$. The bath temperature should be between 60° and 100° C. Within the scope of the invention the following electrolyte composition has been found to be particularly suitable:

Chloride concentration 0.05–4 M, preferably 0.1–2 M; concentration of free acids 0.05–2 M, preferably 0.1–1 M, in particular HCl or alkali chloride; concentration of aluminum ions 0.05–0.6 M, preferably 0.1–0.35 M (M=Mole/liter).

A preferred version of the etching according to the invention comprises 2 steps or 2 groups of steps, where the current density in the first step or first group of steps is equal to 1.5–5 times the current density in the second step or group of steps. This leads to a particularly dense and uniform arrangement of etched out pores.

An additional measure, within the scope of the invention, for preventing a premature drop in transmembrane flow is to subject the aluminum foil to etching only on one side, for example by coating the other side of the foil with an etch resistant layer which is subsequently dissolved. The resultant through-foil pores exhibit a diminishing cross-section the greater the depth of etching. When used as a microfilter the direction of medium flow through the filter is in the opposite direction to the original direction of etching.

Reductions in the pore cross-section due to increasing deposition with increasing pore depth is compensated by the initial increase in pore cross-section. A useful application of this process is such that the maximum thickness of the aluminum foil is limited to 120 μm.

A simpler means of achieving pore diameters of some hundredths of μm for the lowest range of microfilters makes use of a version of the process according to the invention in which the etched pores are made narrower by anodic oxidation in a barrier layer electrolyte prior to the stabilizing after-treatment. Known forming electrolytes can be used for this purpose e.g. boric acid, citric acid, adipic acid and others. A bath voltage of about 70 V per 0.1 μm pore diameter reduction must be applied. In some of the after treatments according to the invention this pretreatment also assists the stabilizing effect.

A further version of the process that reinforces the stabilizing effect of the after-treatment comprises, prior to this after-treatment, the deposition of a boehmite layer on the etched foil surface that may, if desired, be provided with a barrier layer.

The stabilizing after-treatment that hinders hydration reactions is preferably selected from the following group of treatments:

Anodizing in an electrolyte comprising an aqueous solution of $(NH_4)H_2PO_4$ and having a conductivity of 1 to 20 mS. The bath temperature should be 60°–100° C. The voltage to be applied lies between 10 and 500 V.

Immersion in a phosphate solution having a concentration of 0.5 to 5% $(NH_4)H_2PO_4$ for 1 to 30 minutes, the bath temperature being 60° to 100° C. In a preferred version this solution is allowed to flow through the etched foil which, if desired, features a barrier layer.

Immersion in a silicate solution for example alkali-silicates, in a chromate solution for example alkali chromate or in a chromo-phosphate solution.

Covering the whole foil surface with a chemically stable oxide layer; particularly favorable within the scope of the invention are $SiO_2$ or $TiO_2$ layers. The corresponding process comprises the precipitation of an organic Si or Ti compound, preferably of the type Si-$(OR)_4$ or $Ti(OR)_4$ dissolved in a suitable solvent, which is deposited on the foil surface. Subsequently the solvent is evaporated and the remaining organic compound thermally decomposed to the corresponding oxide or to a mixed oxide with aluminum. Suitable for this purpose are blank, boehmitized foils or foils bearing a barrier layer. A further preferred method according to the invention for covering with an oxide layer comprises the transportation of an organic Si of Ti compound, via a water-free substrate, onto the foil surface which may be blank or bear a boehmite or barrier oxide layer, and subsequently transforming the Si or Ti compound into $SiO_2$ of $TiO_2$ by hydrolysis.

Further advantages, features and details of the invention are revealed in the following description of preferred exemplified embodiments.

A 75 μm thick, recrystallized, soft annealed foil of 99.99 wt% aluminum was etched galvanostatically in two steps—using 0.7 $kA/m^2$ in the first step and 0.2 $kA/m^2$ in the second step—with the conversion of 0.3 $MC/m^2$ at 95° C. in a chloride solution having a Cl-concentration of 0.8 M and an HCl and $Al^{3+}$-concentration each of 0.2 M, then subsequently rinsed. Microfilters were prepared in the following 4 different ways to determine the through-membrane flow characteristics; for that purpose ultra-highly filtered, double distilled water was made to flow through each microfilter for 2 h under a pressure of 0.05 MPa.

For version A the foil was dried and employed as a microfilter without any further treatment. At the start of the through-flow test the trans-membrane flow (TMF) amounted to 1.17 $m^3/m^2$ h. After 2 h the TMF fell by 65%.

For version B the oxide layer on the etched foil was stabilized for 2 min. at 85° C. in the through flow medium using an $(NH_4)H_2PO_4$ concentration of 2.7%. The TMF fell only 19% within 2 hours.

In the case of version C the rinsed foil was hydrated, formed to 400 V in a boric acid electrolyte, rinsed and dried. The TMF suffered within 2 h amounted to 82%.

For version D prepared according to the invention the rinsed foil was hydrated in an electrolyte containing 1% $(NH_4)H_2PO_4$ and having a conductivity of 7 in 5 at a temperature of 85° C., then formed to 20 V. The TMF reduction appearing within 2 h in the through flow trial was only 8%.

Listed in the following table are the TMF values of the four variants at the start of the through flow trial, after half an hour and after 2 hours, expressed in $m^3/m^2$ h.

|       | A    | B    | C    | D    |            |
|-------|------|------|------|------|------------|
| 0 h   | 1,17 | 1,12 | 1,08 | 1,28 |            |
| ½ h   | 0,77 | 1,05 | 0,49 | 1,27 |            |
| 2 h   | 0,41 | 0,91 | 0,19 | 1,17 |            |
| 0–2 h | −65  | −19  | −82  | −8   | (% change) |

The much smaller reduction in the TMF experienced during the test period by the variants B and D according to the invention, compared with variants A and C, shows that the after treatment according to the invention successfully reduces the tendency for unacceptable narrowing of the pores due to hydration of the oxide layer.

What is claimed is:

1. Process for manufacturing a microfilter from a recrystallized aluminum foil using electrolytic etching, which comprises: providing a 20 to 250 μm thick aluminum foil of at least 99.95% purity, subjecting said foil to a recrystallizing anneal, etching in an electrolyte in at least one step of constant current density in the range of 0.1 to 2.0 $kA/m^2$ to form an aluminum foil having through-flow pores suitable for use as a microfilter, and stabilizing the surface of the resultant product to prevent a hydration reaction.

2. A process according to claim 1 wherein an aluminum foil of 20–120 μm thickness is employed and etching takes place on only one side.

3. A process according to claim 1 wherein the etched pores are made narrower by anodizing in a barrier layer electrolyte prior to the stabilizing after treatment.

4. A process according to claim 1 wherein a boehmite layer is deposited prior to the stabilizing after treatment.

5. A process according to claim 1 wherein the aluminum foil is at least 99.98% pure.

6. A process according to claim 1 wherein the electrolyte temperature is from 60°–100° C.

7. A process according to claim 1 wherein the non-etched side is coated with an etch resistant layer.

8. A process according to claim 7 wherein the etch resistant layer is dissolved after etching.

9. A process according to claim 1 wherein the etching is performed in 2 stages and such that the current density in the first state is 1.5 to 5 times that employed in the second stage.

10. A process according to claim 1 wherein the stabilizing after treatment comprises a hydration preventative treatment selected from the group consisting of
   (a) anodic oxidation in an electrolyte comprising an aqueous solution of $(NH_4)H_2PO_4$ having a conductivity of 1 to 200 mS;
   (b) immersion in a phosphate solution having an $(NH_4)H_2PO_4$ concentration of 0.5 to 5%;
   (c) immersion in a silicate solution;

(d) immersion in a chromate solution;
(e) immersion in a chrom-phosphate solution;
(f) covering the foil surface with an $SiO_2$ layer by precipitation of an organic Si compound from a solution and thermally decomposing to the oxide;
(g) covering the foil surface with a $TiO_2$ layer by precipitation of an organic Ti compound from a solution and thermally decomposing to the oxide;
(h) covering the foil surface with an $SiO_2$ layer by transportion of an organic Si compound, by means of an aqueous carrier, onto the surface of the foil and subsequently transforming the Si compound into $SiO_2$ by hydrolysis;
(i) covering the foil surface with a $TiO_2$ layer by transportation of an organic Ti compound, by means of an aqueous carrier, onto the surface of the foil and subsequently transforming the Ti compound into $TiO_2$ by hydrolysis;
and mixtures thereof.

11. A process according to claim 1 wherein the etching takes place in more than one step with the current density constant in each step.

12. A process according to claim 1 wherein said electrolyte has a chloride concentration of 0.05–4 M, free acid concentration of 0.05–2 M and aluminum ion concentration of 0.05–0.6 M.

13. A process according to claim 1 including the step of subjecting said microfilter to trans-membrane fluid flow.

* * * * *